(12) United States Patent
Deshpande

(10) Patent No.: US 7,881,335 B2
(45) Date of Patent: Feb. 1, 2011

(54) CLIENT-SIDE BANDWIDTH ALLOCATION FOR CONTINUOUS AND DISCRETE MEDIA

(75) Inventor: Sachin Govind Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 921 days.

(21) Appl. No.: 11/742,158

(22) Filed: Apr. 30, 2007

(65) Prior Publication Data
US 2008/0267213 A1   Oct. 30, 2008

(51) Int. Cl.
*H04J 3/16* (2006.01)
*G06F 15/16* (2006.01)

(52) U.S. Cl. .................... 370/465; 709/226
(58) Field of Classification Search ............ 370/465, 370/468, 235, 230; 709/203, 226
See application file for complete search history.

(56) References Cited

U.S. PATENT DOCUMENTS

| | | | |
|---|---|---|---|
| 5,583,995 A | 12/1996 | Gardner et al. | |
| 5,719,786 A | 2/1998 | Nelson et al. | |
| 5,818,845 A | 10/1998 | Moura et al. | |
| 6,731,605 B1 | 5/2004 | Deshpande | |
| 7,054,365 B2* | 5/2006 | Kim et al. | 375/240.2 |
| 7,369,497 B2* | 5/2008 | Naruse | 370/468 |
| 7,453,805 B2* | 11/2008 | Velev et al. | 370/468 |
| 7,480,727 B2* | 1/2009 | Domschitz | 709/231 |
| 7,627,685 B2* | 12/2009 | Kim et al. | 709/231 |
| 2002/0029274 A1 | 3/2002 | Allen | |
| 2002/0036704 A1* | 3/2002 | Kim et al. | 348/390.1 |
| 2002/0133247 A1 | 9/2002 | Smith et al. | |
| 2003/0067480 A1 | 4/2003 | Gao et al. | |
| 2004/0064504 A1* | 4/2004 | Domschitz | 709/203 |
| 2004/0098748 A1* | 5/2004 | Bo et al. | 725/105 |
| 2005/0283535 A1* | 12/2005 | Covell et al. | 709/231 |
| 2006/0075116 A1* | 4/2006 | Chitilian et al. | 709/227 |
| 2006/0120385 A1* | 6/2006 | Atchison et al. | 370/400 |
| 2006/0146854 A1* | 7/2006 | Park | 370/428 |
| 2009/0222873 A1* | 9/2009 | Einarsson | 370/468 |

FOREIGN PATENT DOCUMENTS

| | | |
|---|---|---|
| CA | 2155354 | 8/1994 |
| CN | 1431660 | 7/2003 |
| WO | WO 02/19130 A1 | 3/2002 |
| WO | WO 03/003760 A2 | 1/2003 |
| WO | WO 03/009581 A1 | 1/2003 |

* cited by examiner

*Primary Examiner*—Andrew Lee
(74) *Attorney, Agent, or Firm*—Michael Blaine Brooks, P.C.; Rosemarie F. Jones; David Ripma

(57) ABSTRACT

The embodiments of the invention relate to client-side bandwidth allocation or rate-lowering processes, systems, and devices. In general, a received continuous stream is received at a lower rate while a discrete media stream is also being received by the client, and having the received continuous stream be received at a previous higher rate when the client is no longer receiving the discrete media stream.

25 Claims, 10 Drawing Sheets

CLIENT-SIDE BANDWIDTH ALLOCATION FOR CONTINUOUS AND DISCRETE MEDIA

FIELD OF THE INVENTION

The embodiments of the present invention relate to computer networks and, more particularly, to client-side bandwidth allocation.

BACKGROUND

A multimedia network session may include audio, video, image, control messages, and other data types. For example, in a distance learning presentation, an instructor may deliver a video lecture accompanied by slides or whiteboard illustrations. The image of the instructor is delivered over the network by a video medium and the sound by an audio medium. The whiteboard illustrations and slides, for example, may be delivered to viewers as images. Other elements of the lecture, such as an outline or prepared notes, may also be delivered as text. Typically, a server program or an application transmits the data representing the multimedia presentation to one or more client programs or applications running typically on several computers or other devices, enabling students to view the lecture. Each media element typically has its own nature and characteristics and different protocols may be used in transmitting each element of the session over the network. For example in a multimedia session such as the exemplary lecture, the server may control the flow and rate of data transmission or "push" data representing certain media elements of the session to the clients. On the other hand, some of the data may be "pulled" from the server with the client controlling the data rate. The data representing some of the elements of the lecture may be transmitted at fixed rates, while data representing other elements may be transmitted at variable rates.

A client may also request different media elements for different client-side applications, such as a request from a web site providing streaming video and a request from another web site providing web pages. The media elements based on these two requests may be received simultaneously by the client. The bandwidth available at the client, however, is generally limited, and may be based on the type of connection available to the client. A method of allocating available bandwidth to effectively transport the varying media elements is highly desirable.

SUMMARY

In one aspect, a method of client-side bandwidth allocation is provided. The method includes the steps of: receiving, at a first rate, at least one continuous media stream; receiving a discrete media stream, while receiving the at least one continuous media stream; if a source of the continuous media stream is adapted to support the continuous media stream at a second rate lower than the first rate, then receiving the at least one continuous media stream at the second rate while receiving the discrete media stream; if the at least one continuous media stream is from a stored media file and the source of the continuous media stream is not adapted to support the continuous media stream at the second rate, then applying a slowdown playout factor adapted to reduce a playout rate of the at least one continuous media stream, while receiving the discrete media stream; if the at least one continuous media stream is transmitted as a live stream and the source of the continuous media stream is not adapted to support the continuous media stream at the second rate, then applying an application-level throttling adapted to slowdown transmission of the at least one continuous media stream, while receiving the discrete media stream; and receiving the at least one continuous media stream at the first rate, after the discrete media stream is no longer being received by the client.

In another aspect, a client device adapted to be operably coupled to one or more sources via a network is provided. The device includes an input and output interface, a continuous media reception module, a discrete media reception module, and a client-side bandwidth allocation (CSBA) process module. The input and output interface is adapted to enable communication via the client device and the one or more sources. The continuous media reception module is adapted to receive at least one continuous media stream. The discrete media reception module is adapted to receive at least one discrete media stream. The CSBA process module is adapted to: if a source of a received continuous media stream, from the one or more received continuous media streams, is adapted to support the received continuous media stream at a rate lower than a previous rate, then receive the received continuous media stream at the lower rate while receiving a discrete media stream from the received discrete media streams, and wherein the source is from the one or more sources operably coupled to the client device; if the received continuous media stream, from the one or more received continuous media streams, is from a stored media file and the source of the received continuous media stream is not adapted to support the received continuous media stream at a rate lower than a previous rate, then apply a slowdown playout factor adapted to reduce a playout rate of the received continuous media stream, while receiving the discrete media stream from the received discrete media streams; if the received continuous media stream, from the one or more received continuous media streams, is received as a live stream and the source of the received continuous media stream is not adapted to support the received continuous media stream at a rate lower than a previous rate, then apply an application-level throttling adapted to slowdown the transmission of the received continuous media stream, while receiving the discrete media stream from the received discrete media streams; receive the received continuous media stream at the previous rate, after the discrete media stream of the received discrete media streams is no longer being received by the continuous media reception module.

In another aspect, a system is provided which includes a source, a client device operably coupled to the source via one or more network segments, and the one or more network segments. The client device includes an input and output interface module, a continuous media reception module, a discrete media reception module, and a client-side bandwidth allocation (CSBA) process module. The input and output interface is adapted to enable communication with the source. The continuous media reception module is adapted to receive a continuous media stream from the source. The discrete media reception module is adapted to receive at least one discrete media stream. The CSBA process module is adapted to: if the source of the continuous media stream is adapted to support the continuous media stream at a rate lower than a previous rate, then receive the continuous media stream at the lower rate while receiving the at least one discrete media stream; if the continuous media stream is from a stored media file and the source is not adapted to support the continuous media stream at a rate lower than a previous rate, then apply a slowdown playout factor adapted to reduce a playout rate of the continuous media stream, while receiving the at least one discrete media stream; if the continuous media stream is received as a live stream and the source is not adapted to support the continuous media stream at a rate lower than a previous rate, then apply an application-level throttling adapted to slowdown the transmission of the continuous media stream, while receiving the at least one discrete media; and receive the continuous media stream at the previous rate, after the at least one discrete media stream is no longer being received by the continuous media reception module.

BRIEF DESCRIPTION OF THE DRAWINGS

The embodiments of the present invention are illustrated by way of example and not limitation in the figures of the accompanying drawings, and in which.

DETAILED DESCRIPTION

Figure 1:
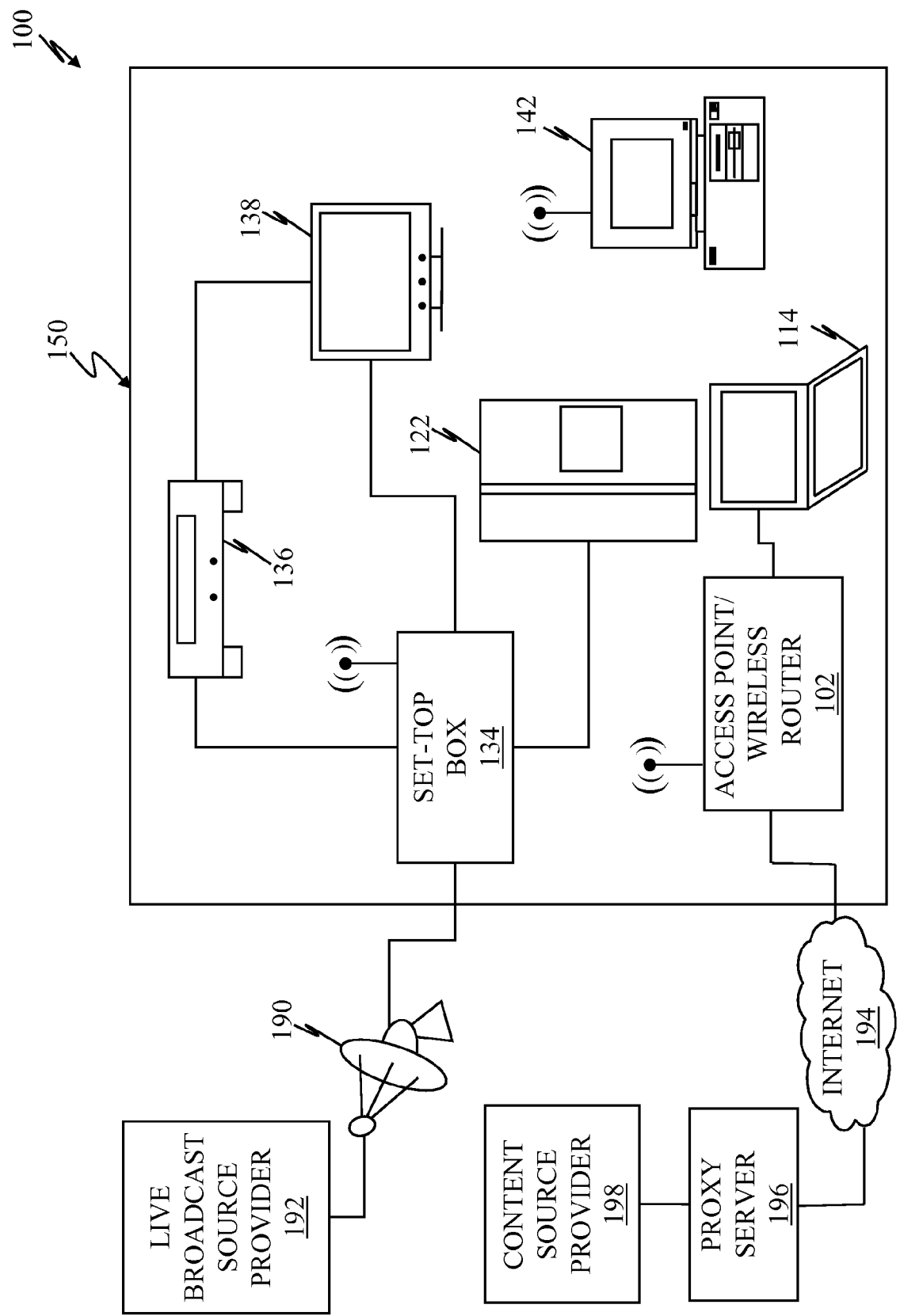
FIG. 1 is a high-level block diagram of an exemplary client-side bandwidth allocation system, according to an embodiment of the invention.
Figure 2:
FIG. 2 is an exemplary table of characteristics of exemplary media, according to embodiments of the present invention.

To better understand the figures, reference numerals within the one hundred series, for example, 134 and 190, are initially introduced in FIG. 1, reference numerals in the two hundred series, for example, 212 and 216, are initially introduced in FIG. 2, and so on and so forth.

In a multimedia session, a host typically acting as a client or receiver may be receiving multiple media elements simultaneously. For example, a live lecture may include video, audio, image, and text elements. Typically, each media element has its own characteristics. A media element/media in the embodiments of the present invention may be categorized as continuous or discrete. Furthermore, in a multimedia session, a client or receiving entity is adapted to receive continuous media elements, discrete media elements, or both, which may come from one or multiple senders or source providers. The receiving entity, the client, however, typically has a limited bandwidth which may be upper bounded by a nominal value and may also be time varying. The client may also be adapted to support different protocols, e.g., a push or pull protocol, to receive the continuous and discrete media elements. The embodiments of the present invention perform client-side bandwidth allocation, when the client simultaneously receives both continuous and discrete media elements in the same session or if the client simultaneously receives multiple continuous media elements and discrete media elements, for example. In some embodiments, because the process described herein is performed at the client, the server/source/sender typically does not have to perform any or additional bandwidth allocation procedures. In some embodiments, however, the client-side bandwidth allocation process entails having the server perform some operations, but such operations are typically as a result of operations performed at the client, including the sending of requests and/or feedbacks by the client to the server, as described and exemplified herein.

FIG. 1 is an exemplary diagram of a client-side bandwidth allocation (CSBA) system 100 wherein media elements may be transmitted according to some embodiments of the invention. In this exemplary embodiment, a local network 150, e.g., in a home or business environment, includes a number of consumer electronics, including a set-top box 134, a digital television (DTV) 138, a wireless personal computer (PC) 142, a digital video or versatile disc (DVD) player 136, a computer laptop 114, a gateway/router 102, and a consumer appliance/device 122, connected via various network links or segments. These various consumer electronics are typically adapted to be networked with each other. Examples of consumer appliances that may be networked into the system 100 include televisions and refrigerators with user interfaces, including displays, radios adapted to receive various media elements, and any other devices adapted to receive media elements via the network and present them accordingly. The local network 150 may comprise various networks—e.g., power line communication (PLC) networks, 802.11a wireless networks, 802.11g wireless networks, and 802.11b wireless networks. Future network specifications such as 802.11n may also be incorporated in such networks. The local network 150 may be operably coupled to one or more source content providers 192, 198, for example, via satellite, cable, and/or terrestrial broadcast 190 or via an external wide area network, such as the Internet 194. A source content provider 192, 198 may provide continuous, discrete, or both media elements that are transmitted to one or more receivers/clients and accordingly be presented in a user interface. For example, a multimedia presentation, such as a live lecture or football game may be requested from a live broadcast source provider 192 that provides live feeds or media elements to clients. These media elements may then be transmitted over network segments, which may be wired or wireless and may also include wide, local, and/or metropolitan area network segments. This exemplary live lecture or football game may then be received by a set-top box 134, for example, via a home wireless network and presented by a digital television 138. This live lecture or football game is typically transmitted as one or more media elements and are typically treated as continuous media elements. In some embodiments, a source provider or an intermediate network node also has one or more proxy servers 196 that are operably connected to the source provider 198. A proxy server 196 thus may be a node in the system, for example, where contents, comprising one or more media elements, may directly or indirectly be requested. Although the receivers or clients of such contents are depicted to be within a local area network, the embodiments of the invention may also apply to other types of receivers, for example, mobile devices adapted to receive and/or present wireless contents. These wireless devices may also be incorporated in vehicles.

A source content provider, server, or sender 192, 198, in some embodiments, may also provide discrete media elements. Such discrete media elements may include images, text, and other data elements. In other embodiments, a server 192, 198 may be adapted to transmit discrete media elements, continuous media elements, or both. In some embodiments, a client may receive continuous media elements and discrete media elements from the same or different source content providers, which may be related or unrelated contents, such as receiving an on-demand movie from one sender and a web page data in response to a web page request from another sender.

FIG. 2 shows a table 200 listing exemplary characteristics 216 of several exemplary media or media elements 212 that may be received by a client in an exemplary network session, and their exemplary communication processes that may be employed to transfer the media elements via a network. Each media element typically has its own characteristics, which may depend on the media element type. In some embodiments, a media element is categorized as continuous or discrete because of a presentation characteristic or requirement. For example, streaming on-demand movie or live movie media elements are typically transmitted such that the receiver or client may start presenting or playing back the content, e.g., the live movie, as soon as the receiving client application has sufficient media elements stored in its receiving buffer, while the client is typically still receiving other media elements related to that movie. For example, audio and video media elements are typically classified as continuous media elements and such elements may be "pushed" by the server to the client or "pulled," while discrete media elements, such as images and text, however, may be "pulled" by the client. An exemplary network session, in some embodiments, may require transmitting a number of media elements, with varying types. For example, a live lecture delivered as part of a distance learning activity may involve transmitting video, audio, image, control data, and text media elements.

A media element, whether continuous or discrete, is typically transmitted as a media stream. One of ordinary skill in the art will appreciate, that a media element transmitted as a media stream may include multiple packets or other data packages or datagrams. Furthermore, in a case where two media elements, e.g., audio and image, are transmitted to a client, the client may receive the packets of these two elements interspersed within each other. Other variations on how a client receives multiple media elements are known. A media stream associated with a media element with a generally continuous presentation characteristic is herein referred to as a continuous media stream. While a media stream associated with a media element with a generally discrete presentation characteristic is herein referred to as a discrete media stream.

A client may be adapted to simultaneously receive discrete media streams and continuous media streams, e.g., simultaneously receive audio and/or video and images and/or text. These discrete and continuous media streams may be related or unrelated with each other and may also be transmitted by the same or different servers. For example, a client is receiving a discrete media stream related to a web page request while at the same time receiving a continuous media stream related to an on-demand movie viewing.

In some embodiments, the server of the source may control the flow and rate of data transfer for data in a push stream. Push protocols may include Real-Time Transport Protocol (RTP) for streaming media and Silicon Graphics Inc. (SGI) MediaBase for video and audio on demand. On the other hand, the client or receiving entity may control the data transfer rate for a pull stream by invoking a pull protocol such as Hypertext Transfer Protocol (HTTP) or File Transfer Protocol (FTP), which may be used for transferring images, text, and, in some cases, other data elements.

In addition to differences in the identity of the controlling entity for the transfer, some media/media elements may be continuously presented in a presentation device, for example, while other media elements of the session are presented discontinuously in discrete units. For example, video and audio elements of a session are typically presented continuously to provide acceptable communication and viewing quality, for example. On the other hand, images, which are generally discrete elements, are typically presented only "occasionally" or in one or more time intervals. A live lecture, for example, may include slides delivered as images at appropriate points in the lecture. Synchronized Multimedia Integration Language (SMIL), an extensible markup language (XML), for example, may be used to communicate the temporal relationships and natures of the various media elements to the client or receiver. SMIL may be adapted to provide markup for timing, layout, animations, visual transitions, and media embedding of multimedia source content. Other appropriate markup languages may also be employed.

The nature of the media element and its presentation characteristics may also influence whether the data transfer protocol provides for reliable delivery. Reliable delivery implies that packets of data are typically transmitted in the original order and are typically prevented from being lost or duplicated, as seen generally at the application-level or layer. The Transmission Control Protocol (TCP) is a connection-oriented protocol providing reliable delivery. TCP/IP, TCP running on top of Internet Protocol (IP), may be used in connection with the transfer of images and text and, occasionally, data. On the other hand, User Datagram Protocol (UDP) is a transport layer protocol for use with the Internet Protocol (IP) network layer that provides best effort or unreliable delivery to an end system. UDP may run on top of IP networks and may provide a direct method of sending and receiving data elements over an IP network. UDP, however, provides few error recovery services and does not guarantee data delivery or duplication. UDP may be used with continuous media streams, such as audio and video transfers, where minimal overhead is important and where correction of errors, for example, data retransmission may likely result in an untimely delivery of the data.

The delivery mechanisms for the various media elements reflect the exemplary requirements or characteristics of the media elements and may set limits on effective bandwidth allocation. Audio encoders typically encode at one or more fixed rates. For example, the dual rate speech encoder of the ITU-T Rec. G.723.1 (03/96) DUAL RATE SPEECH CODER FOR MULTIMEDIA COMMUNICATIONS TRANSMITTING AT 5.3 AND 6.3 KBIT/S, International Telecommunications Union, 1996, may encode audio at a fixed rate of either 5.3 or 6.3 Kilobits per second. Video encoders such as the H.263+encoder for ITU-T RECOMMENDATION H.263, VIDEO CODING FOR LOW BIT RATE COMMUNICATION, International Telecommunications Union, February 1998, H.264, or Moving Picture Experts Group (MPEG) 1, 2, and 4 are typically capable of encoding at any rate within a range established by the encoder's rate control algorithm. As indicated in FIG. 2, images are typically transmitted at a rate determined by the available bandwidth. In addition, in some applications certain media elements may have a higher priority than others.

The communication channel of a network typically has a limited bandwidth which is often established by the client's connection. For example, a client may be connected to an external network, such as the Internet, through a 56-Kbps modem dial-up connection, through a digital subscriber line (DSL) with 1.5 Mbps bandwidth, or the client may be connected through a high speed local area network (LAN). The nature of the bandwidth limitation may also determine whether the total bandwidth is fixed throughout the session or variable with time.

Figure 3:
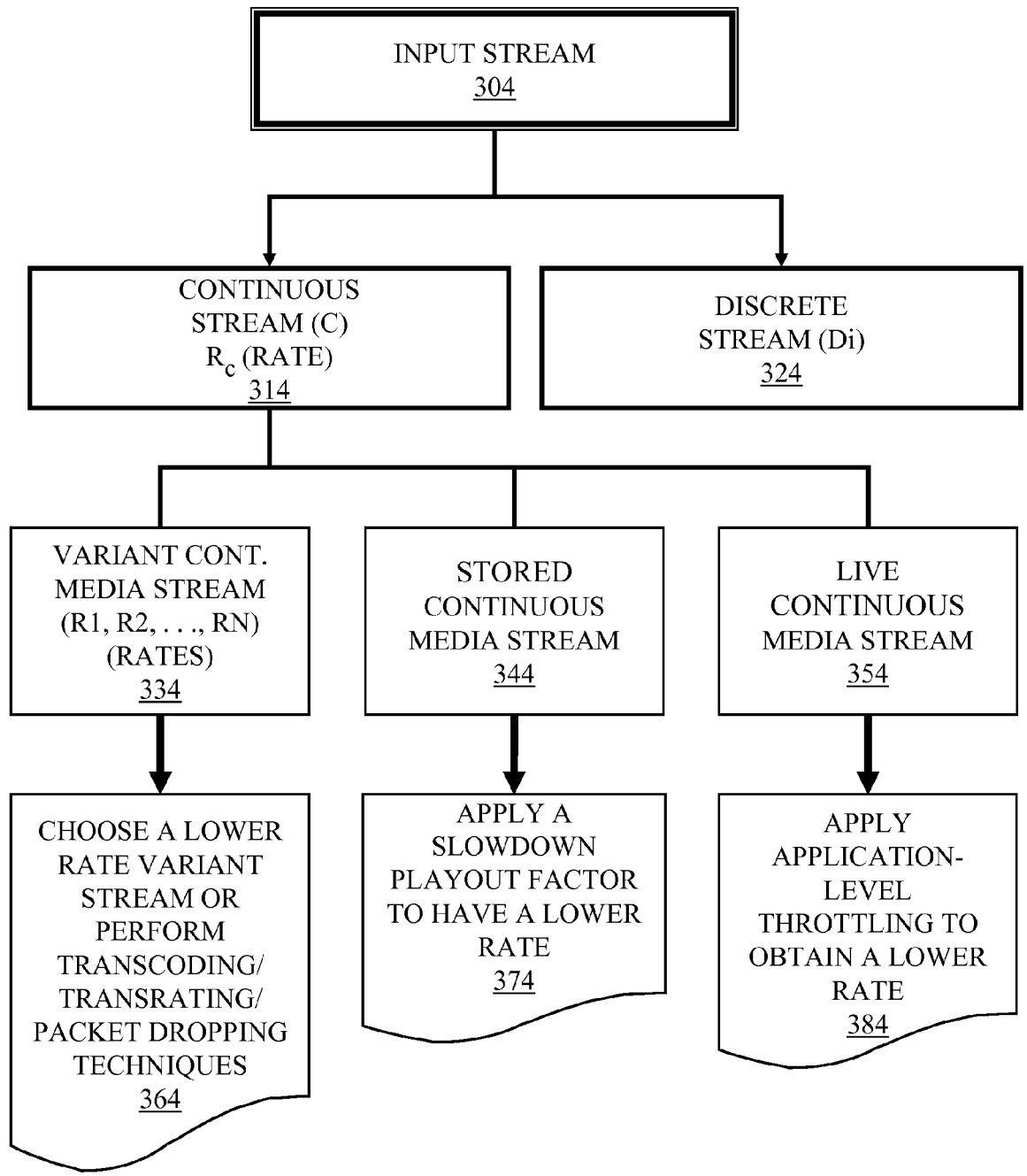
FIG. 3 is an exemplary chart delineating exemplary input streams that may be processed by the exemplary client-side bandwidth allocation system and/or module, according to embodiments of the present invention.

FIG. 3 is a high-level diagram 300 representing exemplary input streams 304 that a client may receive from one or more servers/senders, according to an embodiment of the present invention. An input stream may be classified as a continuous media stream 314 or as a discrete media stream 324. For illustrative purposes, a continuous media stream (C), such as audio and/or video, may be denoted to have an average bit rate, Rc, of bits per second (bps). Furthermore, a continuous media stream may be further categorized as a variant continuous media stream 334, a stored continuous media stream 344, and a live continuous media stream 354. A discrete media stream 324 is typically received by the client via a pull protocol.

Figure 4A:
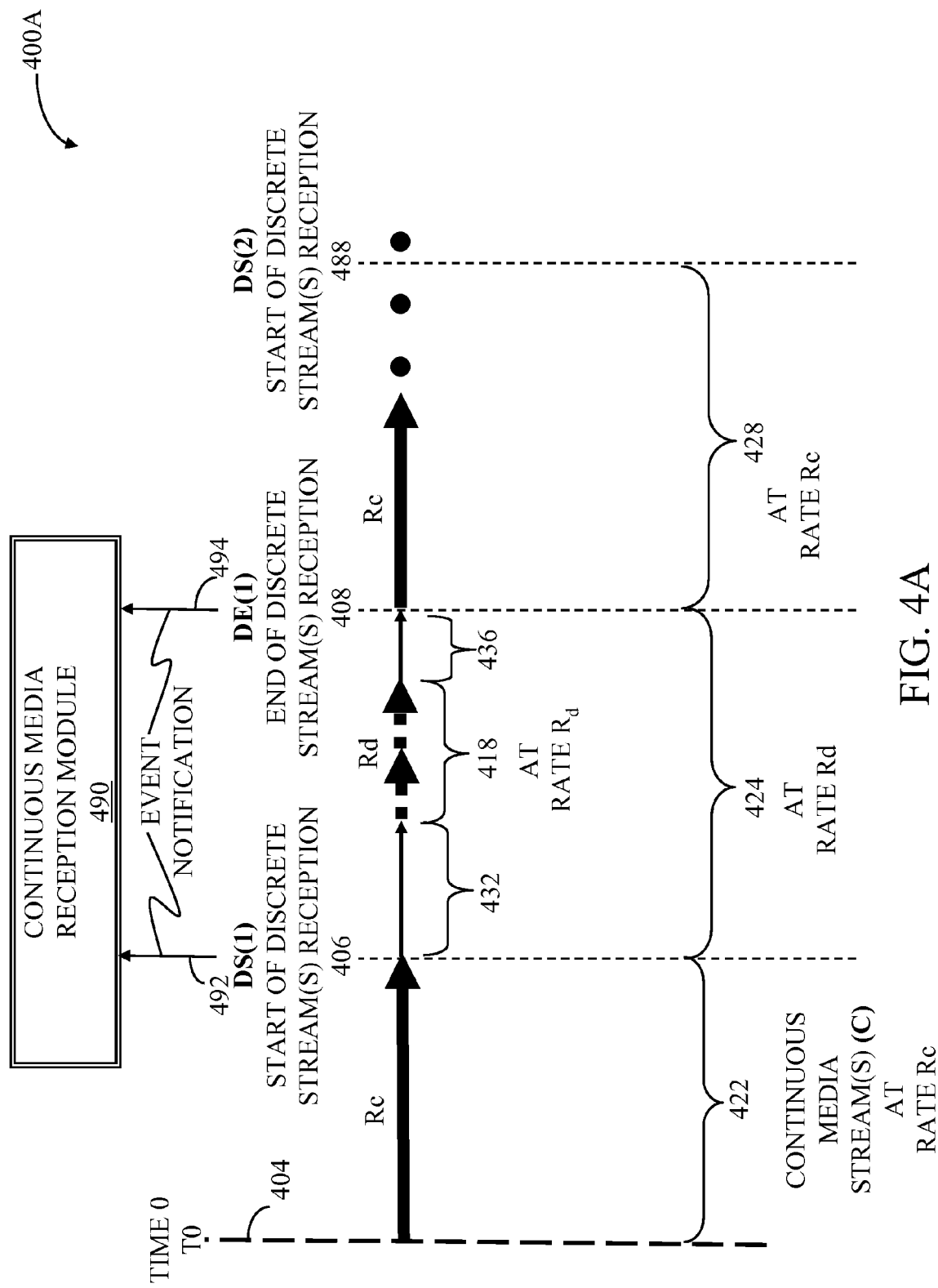
FIGS. 4A, 4B, 4C, 4D, and 4E show exemplary timelines showing receipt of one or more exemplary continuous media streams and one or more discrete media streams, according to embodiments of the present invention.

FIG. 4A is a representational diagram of an exemplary timeline 400A, showing various events occurring in an exemplary timeline or session. FIGS. 3 and 4A are generally discussed together. Furthermore, although the embodiments herein are exemplified and described using a client-side "session," which is associated with a timeline, the embodiments of the present invention may be adapted to apply to other situations, such as when a client is receiving multiple media elements, e.g., text, images, video, and/or audio, from the same or different servers. In general, the CSBA process may be applied when a client is adapted to receive both continuous and discrete media streams. Furthermore, in some embodiments a client may be construed to be several applications, wherein each application at the client receives its own one or more media streams. For discussion purposes, let us assume a timeline, which may be a session that starts at time zero 404, which is when the continuous media stream(s) 422 reception is started at the client.

A stored continuous stream 344 is typically from a source that is stored, e.g., a file, which may also be pre-encoded, such as a stored media file. In this embodiment, the client typically may pull the stored continuous stream from the file using a pull protocol, such as HTTP. Considering that the entire stream or data is available, a client may be adapted to control the pull rate, at which the stored continuous stream is pulled. In this embodiment, the stored continuous stream is typically pulled from one server.

A live continuous stream 354 is a live stream or described in another way, is transmitted by the server as a live stream. A sender or server of a live continuous stream typically transmits the live continuous stream to the client at the defined or suggested rate of the media stream. For example, video, DVD quality, HDTV quality, and VHS quality are suggested or defined to be transferred at approximately 5 Mbps, 15 Mbps, and 1 Mbps, respectively. An exemplary live continuous stream thus may be construed to have some characteristics of a push behavior. However, a pull protocol, such as HTTP, may also be used for transferring or transmitting the live continuous streams to the client. For live continuous media streams 354, the client typically may have limited control over the rate of stream reception.

A variant continuous stream 334 typically implies that the server is adapted to provide the continuous media streams at varying rates. For illustrative purposes, let us denote the two or more available variant continuous streams of the same media content, e.g., video, to have a bit rate (R1, R2, . . . , RN). In an alternative embodiment, the same media content may be available as multiple layers, e.g., a base layer and one or more enhancement layers. Each base plus one or more enhancement layers may be construed as one variant continuous stream. Furthermore, in a unicast session between a server and a client, the server may be adapted to change the stream bit rate by transcoding, transrating, and/or packet dropping.

A discrete media stream, D, 324 may be an image, such as a Joint Photographic Experts Group (JPEG) file, a Graphics Interchange Format (GIF) file, or a Tagged Image File Format (TIFF) file, or other files, such as web page data, e.g., a Hypertext Markup Language (HTML) file, a MACROMEDIA flash file, typically with a ".swf" extension, and text files.

The discrete image stream of the image may be transmitted in parts, e.g., packets, and different discrete images may be received multiples times over the entire "session." A discrete media stream may be associated with two types of events or notifications: a discrete media start event, DSi, and a discrete media reception end/termination event, DEi.

a) Discrete Media Start (DSi): This event occurs when a discrete media stream (Di) reception is started at the client side. This event may be identified or represented with the timeline location DSi 406 on the client session timeline. This may also be construed as the start time of a discrete media stream reception.

b) Discrete Media End (DEi): This event occurs when a discrete media (Di) reception is completed at the client side. This event may be identified or represented with the timeline location DEi 408 on the client session timeline. This may also be construed as the end time of a discrete media stream reception.

In some embodiments, a client module includes a discrete media reception module, not shown, and a continuous media reception module 490. When a discrete media start 406, DSi, or media end, DEi, event occurs 408, the discrete media reception module notifies 492, 494 the continuous media reception module of the occurrence of such event 406, 408. In general, the continuous media is generally transmitted and/or received at a lower rate during the interval where one or more discrete media streams are being received. Described in another way, rate-lowering or bandwidth allocation processes of the CSBA process, in general, are performed typically once a discrete media is received by the client and while at least one continuous media stream is being received. When the rate-lowering or bandwidth-allocation process is performed, however, there may be a slight delay from the CSBA process initiation to when the rate of the continuous media stream is actually lowered for the interval between the occurrences of the DSi 406 and the DEi 408. Furthermore, the various modules of the present invention, for example, the module which monitors for discrete media stream reception or the module that receives the event notifications 492, 494, may be varied, be performed by other modules, and/or be performed by the same module, and yet still be in the scope of the present invention.

The client-side bandwidth allocation (CSBA) process described herein generally lowers the continuous media stream reception rate of a continuous media during the general time interval a discrete media stream is also being received. The rate of reception of the continuous media stream may be lowered by the client. Referring to FIG. 4A, let us assume that at time zero, T0, 404, the client, for example, via a continuous media reception module, receives continuous media stream(s) at rate Rc. This rate Rc for illustrative purposes is a normal and/or an average rate of reception. Furthermore, let us assume that there are two continuous media streams, audio and video streams, each of which may be a constant bit rate (CBR) or variable bit rate (VBR) stream. At the time when a discrete media start reception event occurs 406, the client may perform some bandwidth processes that may produce a result such that the initial rate of the continuous media stream 422, e.g., Rc, is lowered, for example, to Rd, (Rd<Rc), typically during the general time interval 424 the discrete media stream is being received by the client, e.g., between the start 406 and end 408 of discrete media reception. One of ordinary skill in the art will appreciate that the discrete media stream(s) and the continuous media streams(s) may be simultaneously received at the client.

The transmission rate may be lowered, for example, for variant continuous streams 334, e.g., the client may select a continuous media stream at a lower rate supported by the server, i.e., a lower rate variant continuous media stream of the same media element. In this exemplary embodiment, appropriate layer(s) may be chosen rather than a variant continuous stream at a lower rate 364. Furthermore, transrating, transcoding, and/or packet dropping processes may also be performed by the server 364 based on the client request, which may include feedback. For stored continuous streams 344, the client may apply a slowdown playout factor adapted to produce a lower pull reception rate for client reception 374. For live continuous streams 354, the client may apply application-level throttling adapted to produce a lower rate of client reception 384. After the end of the discrete stream reception 408, the client may continue receiving or request to continue receiving the continuous media stream at the initial or previous rate of Rc 428. Compared to clients performing no client-side bandwidth allocation of the present invention, the CSBA described herein typically results in the client receiving the discrete media with a lower delay, at the same time maintaining a certain quality level for the continuous time media stream.

Referring to FIG. 4A, a continuous media stream (C) is received 422 at rate Rc. When a discrete media stream reception occurs 406, a discrete media stream start/initiation event, DSi, 492 may be transmitted to the continuous media stream reception module 490 indicating that an appropriate rate-lowering/bandwidth allocation process be performed. The rate of the continuous media stream C is then reduced to Rd, typically while discrete media streams are being received 424. Once the discrete media stream termination event, DEi, 494 occurs, i.e., the discrete media stream reception has ended 408, the continuous media stream C typically reverts back to its previous, original, or normal rate Rc 428. At some time, another discrete media stream start reception event 488 may occur, which then triggers another rate-lowering/bandwidth allocation process. As mentioned, this entails having continuous media streams being received at a lower rate during the interval that a discrete media stream is being received.

Figure 4B:
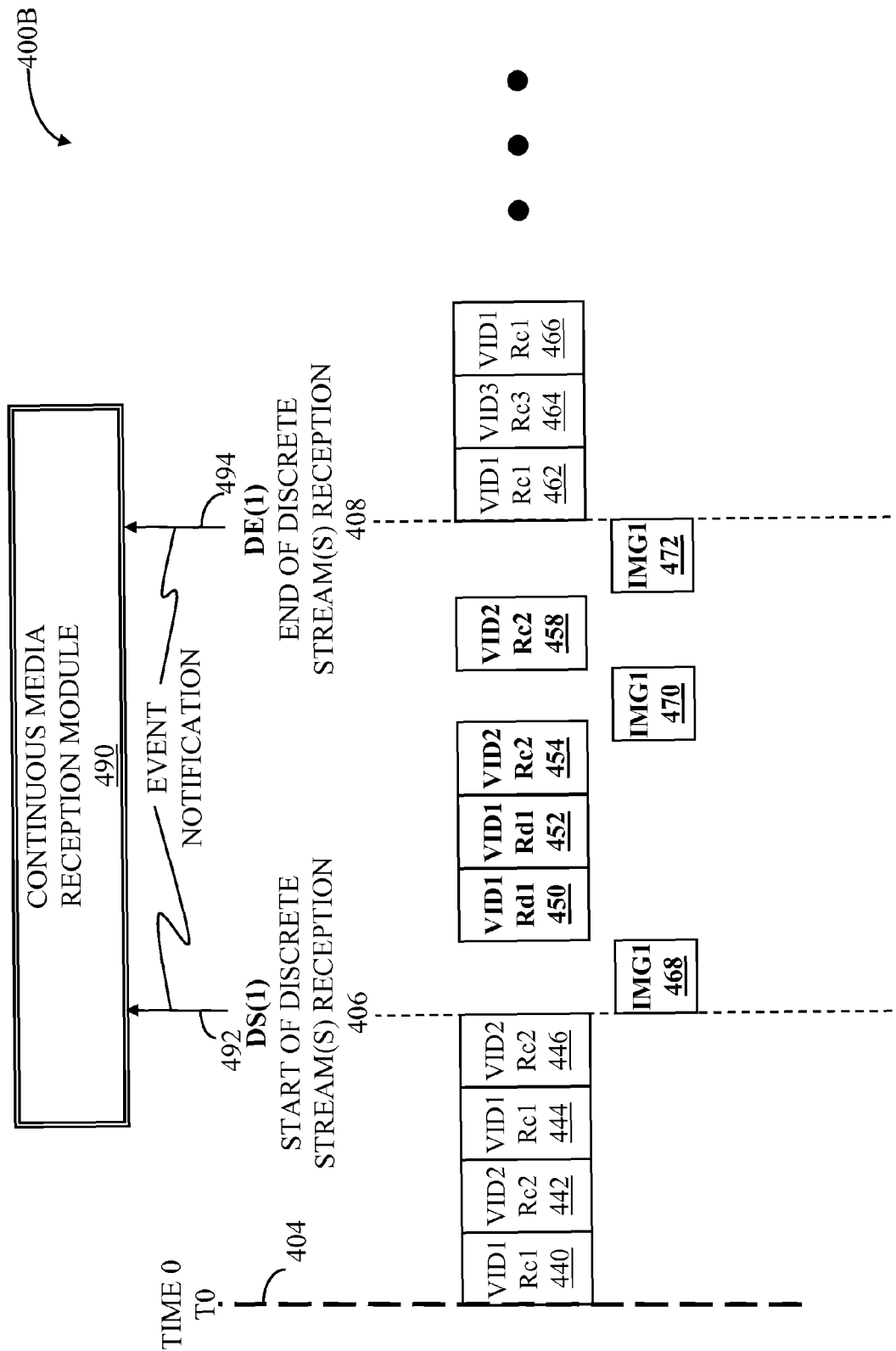

FIG. 4B is another representational diagram of an exemplary timeline 400B, similar to FIG. 4A with some variations and showing a client receiving multiple continuous media streams, e.g., a first video stream, VID1, and a second video stream VID2. In this exemplary embodiment, only one discrete media stream, consisting of three exemplary packets 468, 470, 472 for an image media, is received between DSi 406 and DEi 408. The packets representing VID1 440, 444, and VID2 442, 446 received by an exemplary client, prior to the start of discrete media stream reception 406, are shown being transmitted at rate Rc1 and Rc2, respectively. In this exemplary embodiment, the transmission rate is lowered from Rc1 to Rd1 only for the first video stream, VID1, 450 452, while the rate of the second video stream, VID2, 454, 458 is still received at the original Rc2 rate. The second video stream, VID2, also ends during the interval when the discrete media stream, IMG1 468, 470, 472 is being received. Once the discrete media stream reception ends 408, the first video stream, VID1, 462, 466 reverts to the previous rate Rc. Another video continuous media stream 464 is also received at rate Rc3 464, after the end of the discrete media reception 408. In this exemplary embodiment, only one of the continuous media streams, i.e., VID1 450, 452, during the discrete stream reception interval is reduced to a lower rate.

Figure 4C:
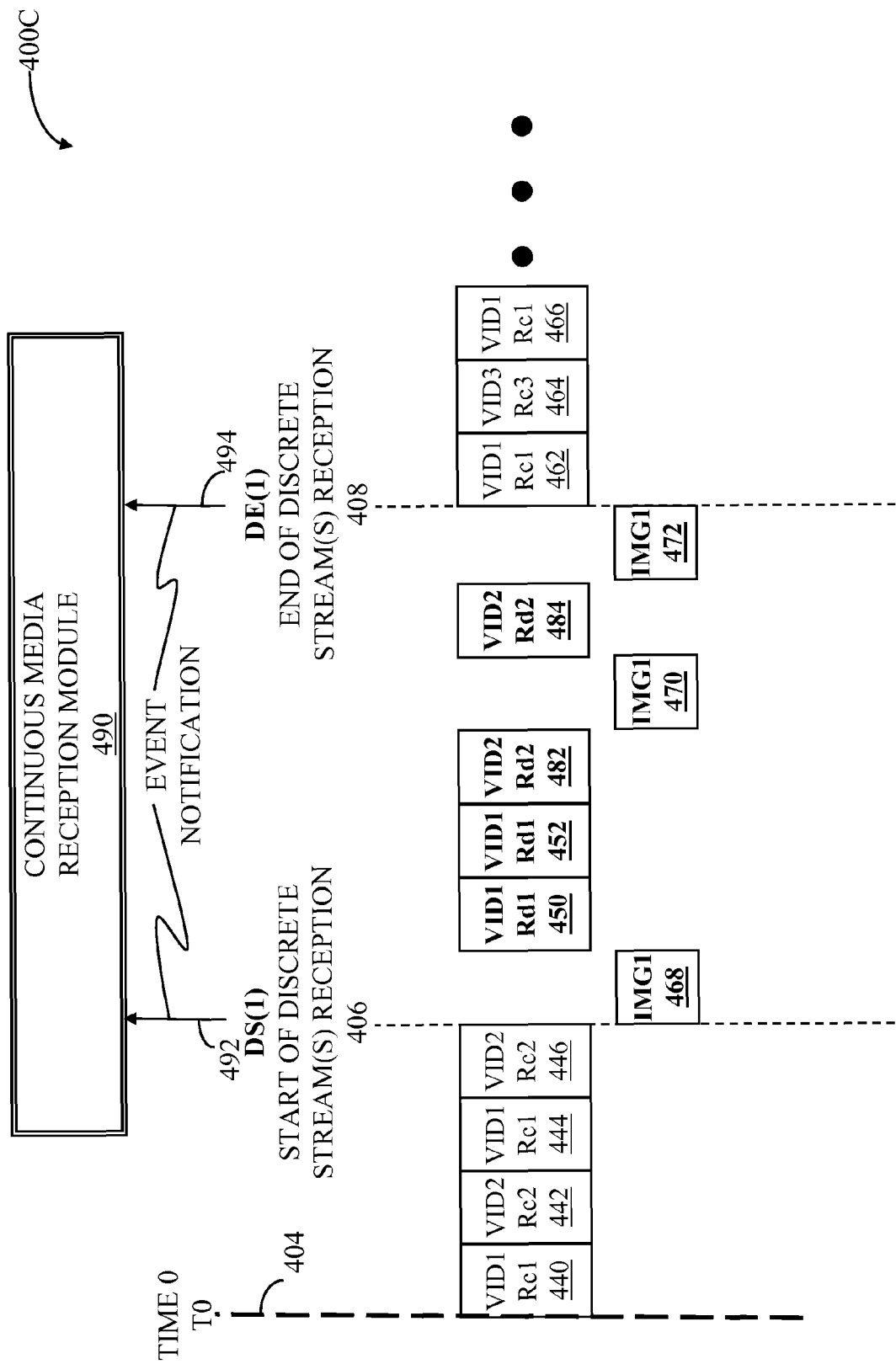

FIG. 4C is another representational diagram of an exemplary timeline 400C, similar to FIG. 4B but showing the rates of multiple continuous media streams, i.e., both the first and second video streams, VID1 450, 452 and VID2 482, 484, being reduced to Rd1 and Rd2, respectively, while the discrete media stream IMG1 468, 470, 472 is being received. In embodiments, where there are multiple continuous media streams being received while a discrete media stream is also being received, the rates of just one or more of such multiple continuous media streams may be lowered while also receiving a discrete media stream or during the discrete stream reception interval. Furthermore, each of the continuous media stream may be lowered to a different rate appropriate for that continuous media stream. If there is only one continuous media stream being received, the rate of that continuous stream is typically lowered during the interval of discrete media stream reception.

Figure 4D:
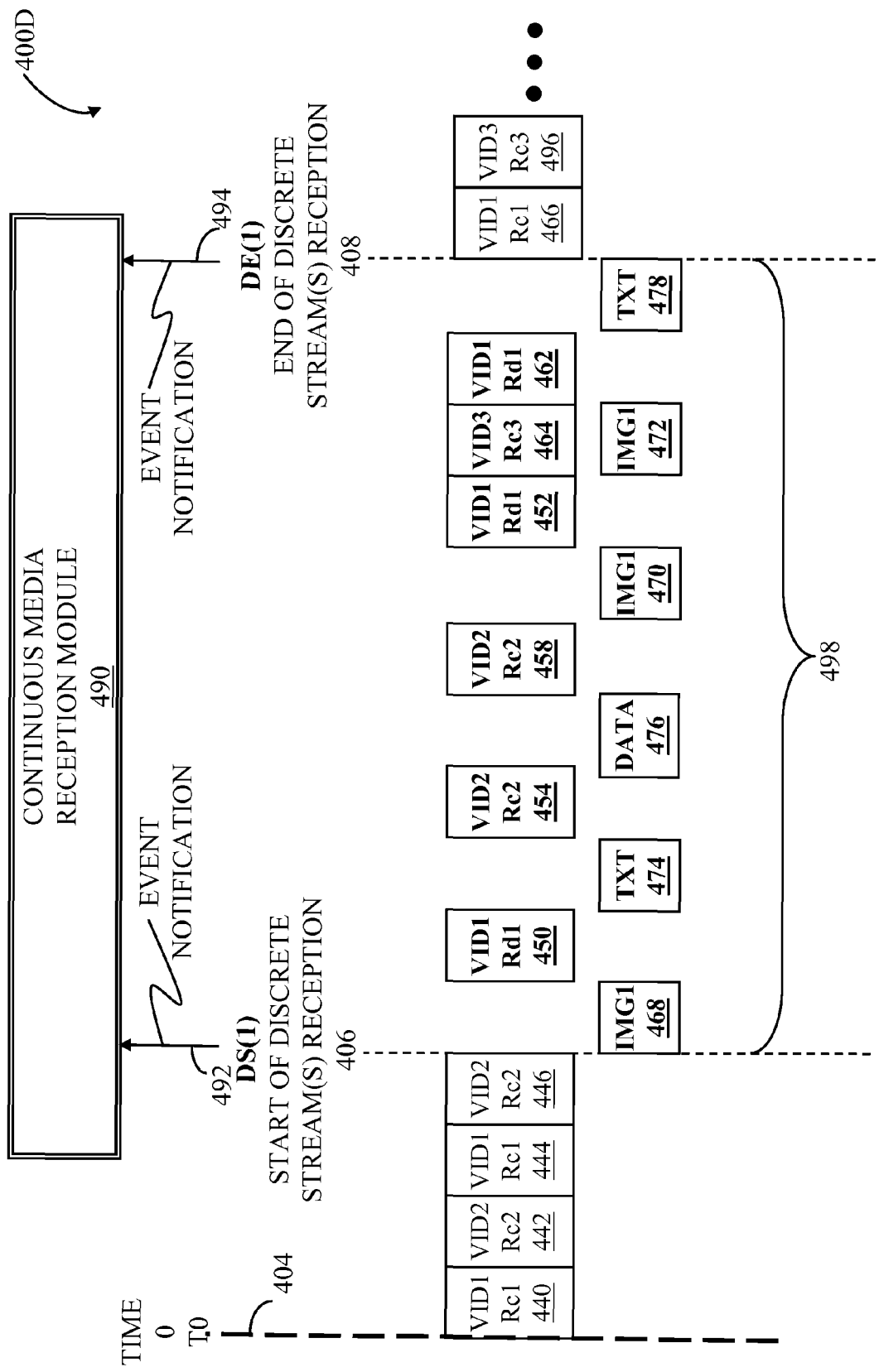

FIG. 4D is another representational diagram of an exemplary timeline 400D, similar to FIG. 4B but with some variations and showing a client receiving multiple discrete media streams, e.g., a first video stream, VID1, and a second video stream, VID2. In some embodiments, as exemplified, the client may receive multiple discrete media streams, each discrete stream related to a differed media element, e.g., a text stream 474, 478 an image stream 468, 470, 472, and an HTML page 476. These discrete media streams may each be expressed or represented by (Di, Si, DSi, DEi), where Si denotes the size in bytes of the discrete media, Di. For illustrative purposes, let us consider that the discrete media streams are received in a non-overlapping manner on the exemplary timeline. In some embodiments, multiple discrete media streams may be received simultaneously. In some embodiments, the CSBA process of the present invention may combine the multiple discrete media streams received simultaneously and treat these multiple discrete streams as a single discrete media stream, which may be represented as (D, (S(k)+S(1)+ . . . +S(n)), min(DS(k), DS(1), . . . , DS(n)), max(DE(k), DE(1), . . . , DE(n))). This representation in general means that the multiple discrete media streams are treated as one discrete stream, D, and the size of that stream D is obtained by adding or accumulating together the size, e.g., byte size of each discrete stream, e.g., byte size of IMG1 468+TXT 474+DATA 476+IMG1 470+IMG1 472+TXT 478. The start of the reception of that discrete stream D is determined based on the earliest reception start time among the multiple discrete streams, i.e., of IMG1 468, and the end of the reception of that discrete stream D is based on the last reception end time among the multiple discrete streams, i.e., of TXT 478. For example, the various discrete media streams 468, 474, 476, 470, 472, 478 are considered as a single discrete media stream and the discrete stream reception interval 498 wherein the rates of one or more continuous media streams are lowered based on the time the first discrete media stream 468 is received and the time the last discrete media stream 478 reception terminates. In this example, only the rate of VID1 450, 452, 462 is lowered from Rc1 to Rd1. The rate of the continuous stream VID2 454, 458 is not changed. Furthermore, another continuous video stream VID3 464 is received during the media stream interval 498 reception. In some embodiments, not shown it is possible that subsequent packets of VID3 464 may be lowered from Rc3 464 to a lower Rd3 rate, during the discrete media stream reception interval 498. After the discrete stream reception interval, the continuous streams still being received typically revert or maintain their original rate of Rc, e.g., VID1 reverts back to Rc1 466.

Figure 4E:
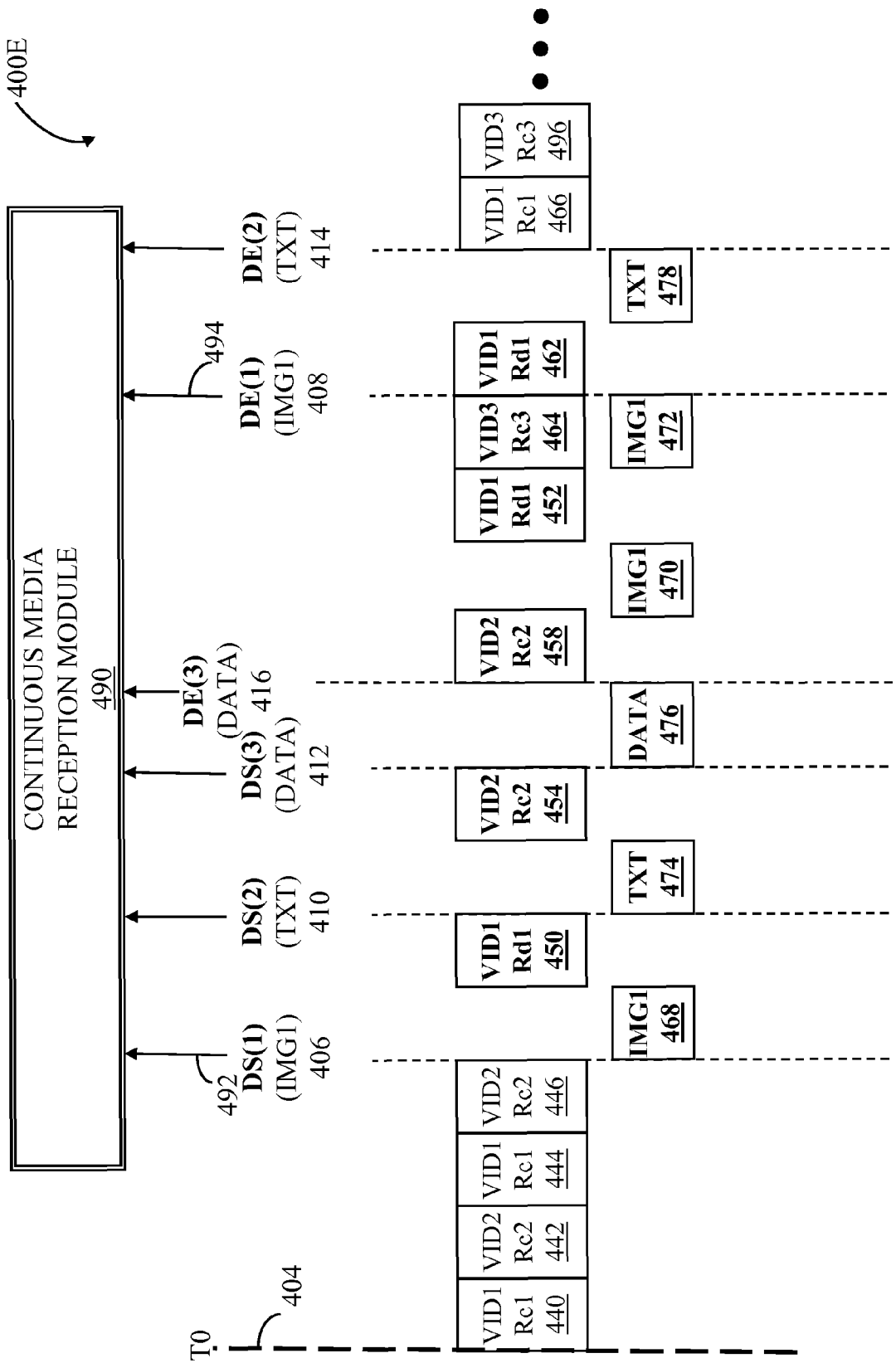

FIG. 4E is another representational diagram of an exemplary timeline 400E, similar to FIG. 4D but with some variations and showing separate discrete media time reception intervals 406-408, 410-414, 412-416 for each different discrete media stream, i.e., IMG1 468, 470, 472, TXT 474, 478, and DATA 476. In other embodiments, the CSBA may separately process each discrete media stream of the multiple discrete media streams. This may mean that each time a new discrete media stream is received, the process of lowering the transmission rate or bandwidth allocation of some or all continuous media streams being simultaneously received may be performed. In this example, a rate-lowering/bandwidth allocation process of the CSBA is performed or initiated for each discrete reception initiation and termination. Thus, in this example, a rate-lowering/bandwidth allocation process is initiated at each interval, DSi(1) 406 to DEi(1) 408, DSi(2) 410 to DEi(2) 414, and DSi(3) 412 to DEi(3) 416.

For illustrative purpose, let us assume that the client has a maximum bandwidth, R, bits per second. Generally, the client bandwidth may be time varying during a session. For discussion purposes, the client bandwidth is assumed to be R at a given time. The embodiments of the present invention, however, may be modified by replacing R with the instantaneous bandwidth at the time of bandwidth allocation R(t). In some embodiments, the client may reallocate bandwidth as described, if the client bandwidth changes substantially during the reception while receiving multiple media elements simultaneously.

Figure 5:
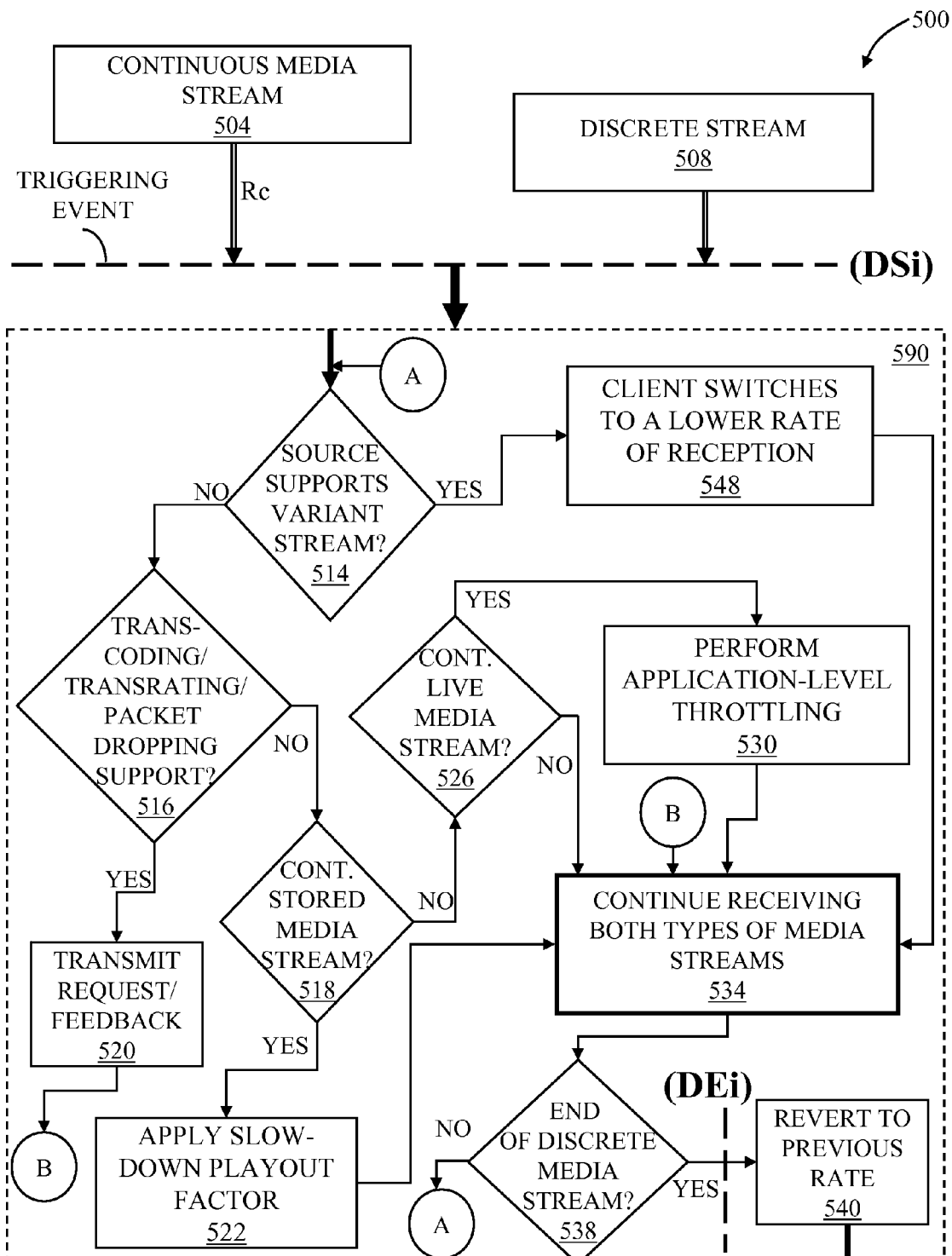
FIG. 5 is an exemplary flowchart illustrating various bandwidth allocation or rate-lowering processes, according to embodiments of the invention.

FIG. 5 is a diagram 500 of an exemplary manner in which exemplary data streams from one or more senders or content source providers may be processed by the exemplary CSBA process of the present invention. For illustrative purposes, let us assume that a client receives a continuous media stream 504 at time zero. At a later or simultaneous time, the client may also start receiving a discrete media stream 508. The start of discrete media stream 508 reception generally triggers the particular bandwidth allocation or rate-lowering process 590 at the client. Let us assume that the continuous media stream 504 is transmitted and/or received at a rate $R_c$, prior to the reception of the discrete stream 508. Generally, the CSBA is aware of the bit rates of each continuous media stream received by the client. This may be determined via packet header information, messages exchanged between the client and the server, by explicit configuration at the client, and/or other processes known to the art.

The bandwidth allocation or rate-lowering process 590 generally starts by determining if the sender or server of the continuous media stream 504 is adapted to support variant continuous streams, i.e., the server is adapted to provide continuous media stream of the same media element at varying rates (step 514). This server capability may be determined by messages exchanged between the client and the server and/or based on pre-configured information in the client, for example. If the server/sender of that continuous media stream 504 is adapted to provide variant streams of that media element, the client typically performs a variant stream process (step 548).

The variant stream process (step 548) generally includes having the client switch to or be adapted to receive at a lower bit rate variant stream of the continuous media element, i.e., with a rate Rd lower than Rc. In some embodiments, the server may support more than two bit rates for the same continuous media element. The choice of which lower bit rate variant stream to switch to or select may be based on one or more of the following exemplary conditions:
  A) Maximally reduce the delay in the discrete media stream reception, and, typically the subsequent playback consumption of the discrete media. In this embodiment, the client CSBA module may drop or choose the lowest available rate variant stream for the continuous media element, available at the server.
  B) The client may drop the continuous media stream to the lowest bit rate variant stream that provides an acceptable presentation quality. This acceptable presentation quality, for example, may be based on some user-configuration or other conditions, which may be non-user configuration conditions. Furthermore, the choice of which variant continuous stream may provide the lowest acceptable quality may be based on one or more of the following exemplary conditions:
    i) Available media information about the stream, including frame-rate, bit rate, resolution, and/or type of encoding;
    ii) Available metadata information about the stream, such as quality labels;
    iii) User configuration information, e.g., a user may specify the lowest acceptable quality.
  C) The lowered rate Rd may also be selected by the CSBA process based on some cost function, which considers the distortion of the continuous media stream and the delay for reception completion of the discrete media stream. An exemplary cost function process, employing a server-side bandwidth allocation, is disclosed, for example, in U.S. Pat. No. 6,731,605, filed Jun. 19, 2000 and issued on May 4, 2004 to the same inventor of this application. This cost function may be applied by the exemplary CSBA process described herein. Other cost function analyses and processes may also be applied in determining the rate Rd of the variant continuous stream.

As mentioned, the rate selected for the continuous media stream, as part of the client-side bandwidth allocation, may be denoted as Rd bps. Using such notation, then the discrete media stream has a nominal available bandwidth of (R−Rd) bps and may finish the reception of the discrete media stream, in an ideal case in (Si)/(R−Rd) seconds in contrast with (Si)/(R−Rc) seconds, which may result in the delay reduction by a factor of (R−Rd)/(R−Rc) for the completion of discrete media reception. When the discrete media reception is completed at DEi, the continuous media reception is switched back to the original variant stream with a bit rate of Rc bits per second.

In some embodiments when dropping to a lower rate stream, Rd, the client may switch to receive the lower rate variant stream, but may continue to receive and present the current stream, i.e., the variant stream at the previous rate Rc, until the client has buffered sufficient data generally equal to the specified pre-roll buffer delay for the lower rate Rc stream. In some embodiments, this process ensures that the user does not notice any freezing while the client switches reception to the lower rate variant stream. In another alternate embodiment, the client may gradually switch reception to the selected lower rate stream by dropping to intermediate rate level streams so that the user does not notice a sudden drop in the quality of the continuous media stream.

In embodiments, wherein the server is not adapted to support variant streams corresponding to various different rates, but is adapted to apply transcoding, transrating, and/or packet dropping techniques and processes to reduce the rate (step 516), the client may control the server by forcing the server to drop data or packets and/or transrate and/or transcode to a lower rate. The client may determine if the server is adapted to support transrating, transcoding, and/or packet dropping by messages exchanged between the client and the server and/or based on pre-configured information in the client, for example. In some embodiments, the client may force the server to perform this server rate-reduction process by sending an explicit feedback request to the server to transmit the media stream at a lower rate (step 520). Alternatively, the client may transmit feedback information, e.g., via out-of-band feedback processes, RTP control protocol (RTCP) reports, in such a manner that the feedback indicates a lowered bandwidth availability at the client, e.g., via increased packet losses, thereby resulting in having the server respond by dropping its transmission rate to a lower value.

On the other hand, if the client is receiving the continuous media stream from a stored media file, i.e., it is a continued stored media stream, and the server is not adapted to support variant streams and transcoding/transrating/packet dropping (step 518, "yes" branch), the client may select a time-scaling or adaptive media playout factor for the stored continuous media stream (step 522). In this embodiment, the client is adapted to control the rate at which the client may pull the continuous media stream. This time-scaling factor may be applied to the playback or the presentation of the continuous media stream thereby having a slower rate than the normal playout rate. This process of using a time-scaling factor may thus enable the client to pull the media at a rate, Rd, lower than the previous stream rate, Rc, during the interval of discrete media reception.

The slow-down time-scaling factor may be chosen, for example, by considering the frame rate e.g., the original/native frame rate, of the stored continuous media stream, and knowledge of the acceptable slow-down factors for the type of data element or media in the stream. For example, for a frame rate of 30 frames per second, a slowdown factor of 25/30 or higher, but less than 1 (<1), may be acceptable. The original or native frame rate relates to the original frame rate with which the stored continuous media stream is coded. In some embodiments, the client may be adapted to receive data input to configure the client module to an acceptable slow-down factor or may be adapted to receive input so as to interactively change the slowdown factor during client reception. In some embodiments, the slowdown factor may also be chosen based upon the reduced rate Rd at which the client may be configured to pull the continuous media. The rate Rd, in some embodiments, may be computed using a cost function approach as described in U.S. Pat. No. 6,731,605 previously mentioned above. Other cost function analyses and processes may also be applied in computing the rate Rd of the stored continuous stream.

Assuming that the selected slowdown factor is S, where S<1, the rate at which the client is adapted to pull the stored continuous media stream may be represented as S*Rc. Using this notation, the discrete media stream may have a nominal available bandwidth of (R−(S*Rc)) bps and thus typically may finish the reception for the discrete media in an ideal case in (Si)/(R−(S*Rc)) seconds in contrast with (Si)/(R−Rc) seconds, which may result in the delay reduction by a factor of (R−(S*Rc))/(R−Rc). When the discrete media reception is completed at DEi, the selected slowed playout of the stored continuous media is typically replaced by having the stored continuous media be played out or presented again at the normal or previous playout rate, prior to application of the slowdown factor. The client may then start pulling the stored continuous time media stream at the actual stream rate Rc. In some embodiments, the client may compensate for the slow-down factor, which typically results in the stretching of the duration of the continuous media stream, by receiving and playing back at a faster rate, typically based on an increased time-scaling of the stored media stream, if the client bandwidth is adapted to support this increased reception.

On the other-hand, if the continuous media stream from the server is a continuous live media stream (step 526, "yes" branch), the client may perform application-level throttling to temporarily reduce the rate of reception (step 530). For example, if the client is receiving the continuous media stream using HTTP protocol, the application-level throttling of the reception rate may be achieved by the client using TCP sliding-window behavior. This sliding-window behavior, generally involves having the client letting the TCP receiver side buffer be filled at the stream rate (Rc), but the application accessing such buffer only periodically reads the data from the stack, e.g., using recv( ) socket function, thereby to effectively reduce the reception bandwidth to a lower value. In this embodiment, the client acknowledges receipt of packets, for example, less than the number of packets actually received.

Typically, the server transmitting the live continuous media stream maintains the connection and is adapted to enable the client to "lag" in the live stream with respect to the timeline up to a certain degree. For example, let us assume that the server is adapted to enable the client to lag in the media stream to at most L seconds. Let us further assume that the client has a pre-roll buffer, which was filled at the start of the live continuous media session and that buffer has P seconds of data in it currently. Based on these conditions, the client may take any of the following exemplary approaches:

a) If L<=(Si/R) and L<=P, then the client may temporarily stop reading the continuous media data from the stack and may be able to complete the reception of the discrete media stream in ideally Si/R seconds. The condition of checking whether (L<=(Si/R) and L<=P) is to determine if the client were to temporarily stop receiving the media stream and thereby resulting in a lag in the stream for L seconds as allowed by the server, whether the client has enough media data buffered to playback and whether the discrete media stream reception may be able to complete or finish within this time. By temporarily stopping the reading of the live continuous media stream, a delay reduction by a factor of (R/(R−Rc)) for the discrete media may be obtained. Furthermore, after the discrete media reception is completed, the application-level throttling for the live continuous media stream may be disabled and the live continuous media reception may be started at the previous or original stream rate. In some embodiments, the client may compensate for the lag in the stream by reading the data faster, which the server typically may support till the lag is compensated.

b) Assuming a more general case, the client may choose a time-scale or slowdown—e.g., adaptive media playout—factor H and may apply an application-level throttling process to receive the data at a rate, (H*Rc), for L/H seconds or for (L+Cb)/H seconds where Cb represents the buffered data in seconds in the client buffer which may be applied during this phase.

i) The discrete media may have a nominal available bandwidth of (R−(H*Rc)) bps for L/H seconds and may finish discrete media reception in an ideal case in (Si)/(R−(H*Rc)) seconds, typically if (Si<=(R−(H*Rc))*(L/H)), i.e., the size of the discrete media stream is less than the available bandwidth. On the other hand, if Si>(R−(H*Rc))*(L/H)), i.e., the size of the discrete media stream is estimated to be greater than the available bandwidth, then the client side may receive the discrete media at (R−Rc) rate for the remaining discrete media data size.

ii) Alternatively, the client may temporarily halt or stop the discrete media reception and enable the continuous media stream to recover from the lag of L seconds and may repeat the application-level throttling. In some embodiments the client side may choose an approach in between the last two alternatives.

In some embodiments when receiving live stream from a server in unicast (one-to-one) manner, the transcoding, transrating, and/or packet dropping process may additionally be applied with application-level throttling and/or with adaptive media playout for overall rate reduction. In yet another embodiment, all the techniques, e.g., transcoding, transrating, packet dropping, application-level throttling, and adaptive media playout may be applied together.

During the discrete media reception interval, continuous and discrete media systems continue to be received (step 534). Once the discrete media stream reception ends (step 538), the one or more continuous media streams are typically reverted to their previous appropriate rates (step 540).

Figure 6:
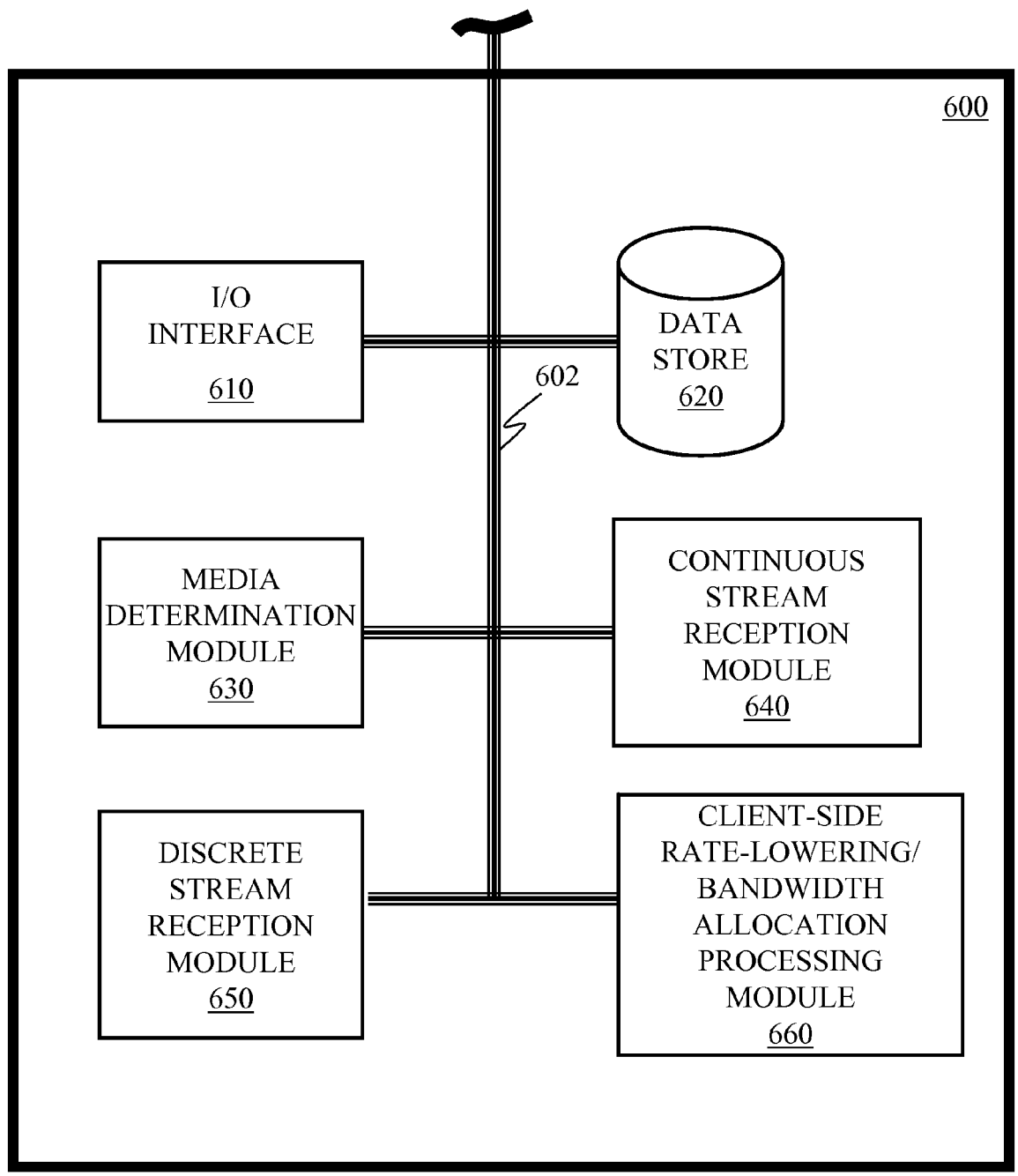
FIG. 6 is an exemplary client or receiving device, according to an embodiment of the invention.

FIG. 6 is a block diagram of an exemplary client/receiver device or module adapted to perform the client-side bandwidth allocation or rate-lowering process described herein. The exemplary client device 600 typically includes an input/output I/O interface card 610 adapted to enable the client device 600 to communicate via the network. The client device 600 may also include a data store 620, which may be volatile or non-volatile memory. Such a data store 620 may contain one or more client buffers, such as a playout buffer, for example. The data store 620 may also contain rate information associated with media streams, so as to keep track of rates to which continuous media streams may revert to after the end of the appropriate discrete media stream reception interval. The media determination module 630 may be adapted to determine whether the received input data is a continuous media stream or a discrete media stream. The media determination module 630 may also determine the type of continuous media stream, e.g., whether the continuous media stream is supported as variant streams, is from a stored continuous media stream, or is a live continuous media stream. The continuous stream reception module 640 monitors and detects the reception of the continuous media streams, as well as processes or forwards such streams to the appropriate modules for further processing, such as stream playout. The continuous stream reception module may also be adapted to receive discrete media reception initiation and termination event notifications. The discrete media stream reception module 650 may be adapted to monitor or detect the receipt of discrete media streams, as well as transmit event notifications, DSi and DEi, to the continuous stream reception module 640. The client-side rate-lowering/bandwidth allocation processing module 660 is adapted to perform the rate lowering features described herein, including transmitting appropriate messages or feedbacks to a server, if appropriate. In some embodiments, the client device 600 may also include a codec module, not shown, adapted to decode the received media streams. Furthermore, a playout module, not shown, may also be available and adapted to present the decoded media streams on a presentation device thereby enabling a user to accordingly view and/or hear the presentation. In some embodiments of the invention, the different modules in FIG. 6 may communicate and interface with each other via a bus, dedicated signal paths or one or more channels 602. Depending on the function of the device, other modules, including functions and capabilities, may be added or removed. Furthermore, the modules described herein may be further subdivided and combined with other functions so long as the function and processes described herein may be performed. The various modules may also be implemented in hardware, e.g., chips or circuit components, as a set of program instructions—i.e., software, or both, i.e., firmware. In other embodiments, not shown, the various modules 630, 640, 650, 660 may be implemented in physically separate devices and may communicate with each other over network or other communication channels.

Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In particular, the operations and processes described herein may be varied, e.g., order change, and yet still be in the scope of the present invention. Furthermore, the embodiments of the present invention in addition to being applicable to video streaming may also apply to distributed simulations, video-conferencing, and multi-party games. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of client-side bandwidth allocation, the method comprising the steps of:

receiving, at a first rate, at least one continuous media stream;

receiving a discrete media stream, while receiving the at least one continuous media stream;

if a source of the continuous media stream is adapted to support the continuous media stream at a second rate lower than the first rate, then receiving the at least one continuous media stream at the second rate while receiving the discrete media stream;

if the at least one continuous media stream is from a stored media file and the source of the continuous media stream is not adapted to support the continuous media stream at the second rate, then applying a slowdown playout factor adapted to reduce a playout rate of the at least one continuous media stream, while receiving the discrete media stream;

if the at least one continuous media stream is transmitted as a live stream and the source of the continuous media stream is not adapted to support the continuous media stream at the second rate, then applying an application-level throttling adapted to slowdown transmission of the at least one continuous media stream, while receiving the discrete media stream; and receiving the at least one continuous media stream at the first rate, after the discrete media stream is no longer being received by the client.

2. The method of claim 1, wherein the second rate of the step of receiving the at least one continuous media stream at the second rate while receiving the discrete media stream, is the lowest rate adapted to be supported by the source of the continuous media stream.

3. The method of claim 1, wherein the second rate of the step of receiving the at least one continuous media stream at the second rate while receiving the discrete media stream, is the lowest rate at which the quality of the continuous media stream is acceptable based on a condition.

4. The method of claim 1, wherein the second rate of the step of receiving the at least one continuous media stream at the second rate while receiving the discrete media stream, is based on reducing a delay in receiving the discrete media stream.

5. The method of claim 1, wherein the second rate of the step of receiving the at least one continuous media stream at the second rate while receiving the discrete media stream, is based on at least one of the following conditions:
media information associated with the at least one continuous media stream, wherein the media information comprises frame rate, bit rate, resolution, and encoding type;
metadata associated with the at least one continuous media stream, wherein the metadata comprises quality labels;
user configuration information; and
a cost function adapted to consider a distortion of the at least one continuous media stream and the delay of receiving the discrete media stream.

6. The method of claim 1, wherein the second rate of the step of receiving the at least one continuous media stream at the second rate while receiving the discrete media stream, comprises an intermediate rate and a last rate, wherein the intermediate rate is lower than the first rate and the last rate is lower than the intermediate rate.

7. The method of claim 1, wherein the discrete media stream comprises two or more discrete media streams, wherein the discrete media stream is based on accumulating the size of each of the two or more discrete media streams, and wherein the discrete media stream is deemed being received based on an earliest reception time among the reception time of the two or more discrete media streams and on a latest reception time among the reception of the two or more discrete media streams.

8. The method of claim 1, wherein the slowdown playout factor is based on a native frame rate of the at least one continuous media stream.

9. The method of claim 1, wherein the at least one continuous media stream comprises a first continuous media stream and an another continuous media stream, and wherein the step of receiving the at least one continuous media stream at the second rate while receiving the discrete media stream comprises receiving the first continuous media stream at the first rate.

10. The method of claim 1, wherein the at least one continuous media stream comprises a first continuous media stream and an another continuous media stream, and wherein the step of applying a slowdown playout factor adapted to reduce a playout rate of the at least one continuous media stream comprises applying the slowdown playout factor to the first continuous media stream.

11. The method of claim 1, wherein the at least one continuous media stream comprises a first continuous media stream and an another continuous media stream, and wherein the step of applying the application-level throttling adapted to slowdown transmission of the at least one continuous media stream is for the first continuous media stream.

12. The method of claim 1, wherein the step of receiving the at least one continuous media stream at the second rate while receiving the discrete media stream, if the source of the continuous media stream is adapted to support the continuous media stream at the second rate lower than the first rate, further comprises the steps of:
transmitting a request to the source of the continuous media stream to apply the second rate; and
performing by the source at least one of the following: transcoding, transrating, packet dropping to obtain the second rate.

13. A client device adapted to be operably coupled to one or more sources via a network, the device comprises:
an input and output interface adapted to enable communication via the client device and the one or more sources; and
a continuous media reception module adapted to receive at least one continuous media stream;
a discrete media reception module adapted to receive at least one discrete media stream; and
a client-side bandwidth allocation (CSBA) process module adapted to:
if a source of a received continuous media stream, from the one or more received continuous media streams, is adapted to support the received continuous media stream at a rate lower than a previous rate, then receive the received continuous media stream at the lower rate while receiving a discrete media stream from the received discrete media streams, and wherein the source is from the one or more sources operably coupled to the client device;
if the received continuous media stream, from the one or more received continuous media streams, is from a stored media file and the source of the received continuous media stream is not adapted to support the received continuous media stream at a rate lower than a previous rate, then apply a slowdown playout factor adapted to reduce a playout rate of the received continuous media stream, while receiving the discrete media stream from the received discrete media streams;
if the received continuous media stream, from the one or more received continuous media streams, is received as a live stream and the source of the received continuous media stream is not adapted to support the received continuous media stream at a rate lower than a previous rate, then apply an application-level throttling adapted to slowdown the transmission of the received continuous media stream, while receiving the discrete media stream from the received discrete media streams;
receive the received continuous media stream at the previous rate, after the discrete media stream of the received discrete media streams is no longer being received by the continuous media reception module.

14. The client device of claim 13, wherein the CSBA module is further adapted to, if the source of the received continuous media stream is adapted to support the received continuous media stream at the rate lower than a previous rate while receiving the discrete media stream, receive the received continuous media stream at the lowest rate supported by the source.

15. The client device of claim 13, wherein the CSBA module is further adapted to, if the source of the received continuous media stream is adapted to support the received continuous media stream at the rate lower than a previous rate while receiving the discrete media stream, receive the received continuous media stream at the lowest rate at which the quality of the continuous media stream is acceptable based on a condition.

16. The client device of claim 13, wherein the CSBA module is further adapted to, if the source of the received continuous media stream is adapted to support the received continuous media stream at the rate lower than a previous rate while receiving the discrete media stream, receive the received continuous media stream at the lower rate based on maximally reducing a delay in receiving the discrete media stream.

17. The client device of claim 13, wherein the CSBA module is further adapted to, if the source of the received continuous media stream is adapted to support the received continuous media stream at the rate lower than a previous rate while receiving the discrete media stream, receive the received continuous media stream at the lower rate based on at least one of the following conditions:

media information associated with the received continuous media stream, wherein the media information comprises frame rate, bit rate, resolution and encoding type;

metadata associated with the received continuous media stream, wherein the metadata comprises quality labels;

user configuration information; and a cost function adapted to consider a distortion of the received continuous media stream and the delay of receiving the discrete media stream.

18. The client device of claim 13, wherein the CSBA module is further adapted to, if the source of the received continuous media stream is adapted to support the received continuous media stream at the rate lower than a previous rate while receiving the discrete media stream, receive the received continuous media stream at an intermediate rate higher than the lower rate prior to receiving the received continuous media stream at the lower rate.

19. The client device of claim 13, wherein the received discrete media stream is based on accumulating the size of two or more discrete media streams from the received discrete media streams, and wherein the received discrete media stream is deemed being received based on an earliest reception time among the reception time of the two or more discrete media streams and on a latest reception time among the reception of the two or more discrete media streams.

20. The client device of claim 13, wherein the slowdown playout factor is based on a native frame rate of the received continuous media stream.

21. The client device of claim 13, wherein CSBA module is further adapted to receive another continuous media stream at a first rate from the received continuous media streams, wherein the first rate is unchanged even while receiving the discrete media stream.

22. The client device of claim 13, wherein the CSBA module is further adapted to apply a slowdown playout factor to only one continuous media stream of the received continuous media streams, while receiving the discrete media stream.

23. The client device of claim 13, wherein the CSBA module is further adapted to:

transmit a request to the source of the received continuous media stream to apply the rate lower than the previous rate, if the source of the received continuous media stream, from the one or more received continuous media streams, is adapted to support the received continuous media stream at the rate lower than a previous rate.

24. A system comprising:

a source;

a client device operably coupled to the source via one or more network segments, the client device comprising:

an input and output interface adapted to enable communication with the source;

a continuous media reception module adapted to receive a continuous media stream from the source;

a discrete media reception module adapted to receive at least one discrete media stream; and a client-side bandwidth allocation (CSBA) process module adapted to:

if the source of the continuous media stream is adapted to support the continuous media stream at a rate lower than a previous rate, then receive the continuous media stream at the lower rate while receiving the at least one discrete media stream;

if the continuous media stream is from a stored media file and the source is not adapted to support the continuous media stream at a rate lower than a previous rate, then apply a slowdown playout factor adapted to reduce a playout rate of the continuous media stream, while receiving the at least one discrete media stream;

if the continuous media stream is received as a live stream and the source is not adapted to support the continuous media stream at a rate lower than a previous rate, then apply an application-level throttling adapted to slowdown the transmission of the continuous media stream, while receiving the at least one discrete media; and receive the continuous media stream at the previous rate, after the at least one discrete media stream is no longer being received by the continuous media reception module; and the one or more network segments.

25. The system of claim 24 wherein the CSBA module of the client is further adapted to:

transmit a request to the source of the received continuous media stream to apply the rate lower than the previous rate, if the source of the received continuous media stream, from the one or more received continuous media streams, is adapted to support the received continuous media stream at the rate lower than a previous rate; and wherein the source is further adapted to transmit the received continuous media stream at the rate lower than the previous rate by performing at least one of the following: transcoding, transrating, packet dropping to obtain the lower rate.

* * * * *